United States Patent
Dehrmann

[11] Patent Number: 6,158,560
[45] Date of Patent: Dec. 12, 2000

[54] LOCKUP CLUTCH FOR A HYDRODYNAMIC TORQUE CONVERTER

[75] Inventor: Uwe Dehrmann, Würzburg, Germany

[73] Assignee: Mannesmann Sachs AG, Schweinfurt, Germany

[21] Appl. No.: 09/259,517

[22] Filed: Feb. 26, 1999

[30] Foreign Application Priority Data

Feb. 27, 1998 [DE] Germany ............................ 198 08 299

[51] Int. Cl.[7] ................................................. F16H 45/02
[52] U.S. Cl. .................... 192/3.29; 192/52.6; 192/107 C
[58] Field of Search ................... 192/3.28, 3.29, 192/70.28, 101, 52.6, 107 C, 3.3

[56] References Cited

U.S. PATENT DOCUMENTS

| | | | |
|---|---|---|---|
| 5,186,292 | 2/1993 | Hageman et al. | 192/3.28 |
| 5,211,270 | 5/1993 | Tamura et al. | 192/3.29 |
| 5,918,713 | 7/1999 | Shimizu et al. | 192/3.29 |

FOREIGN PATENT DOCUMENTS

| | | |
|---|---|---|
| 0 407 895 B1 | 11/1994 | European Pat. Off. . |
| 34 10 526 A1 | 10/1985 | Germany . |
| 44 25 912 A1 | 2/1995 | Germany . |

*Primary Examiner*—Charles A. Marmor
*Assistant Examiner*—Saúl Rodríguer
*Attorney, Agent, or Firm*—Cohen, Pontani, Lieberman & Pavane

[57] ABSTRACT

A lockup clutch in a hydrodynamic torque converter has an axially movable piston which can be pressed against a contact face of a flange of the converter housing in a switching position via at least one friction facing. At least one of the structural component parts of the flange of the converter housing or the piston serves as a carrier for a deformation element axially arranged between it and the other structural component part. The deformation element is connected with the carrier on at least one radial side and is in a working connection with the carrier at least at the other radial side via an elastic supporting device. The deformation element extends at least within the area of extension of the friction facing.

16 Claims, 3 Drawing Sheets

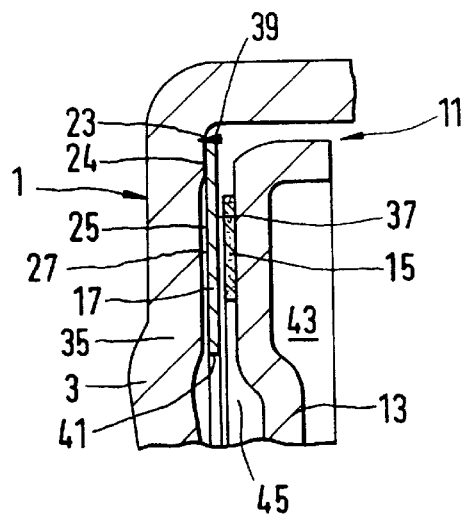
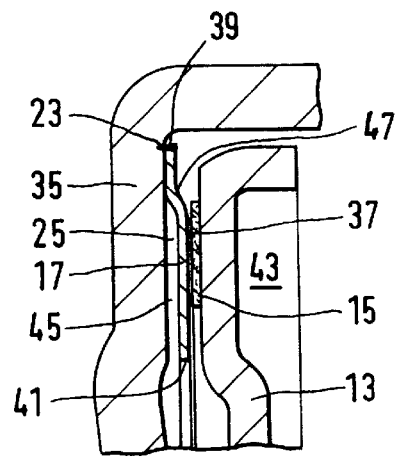
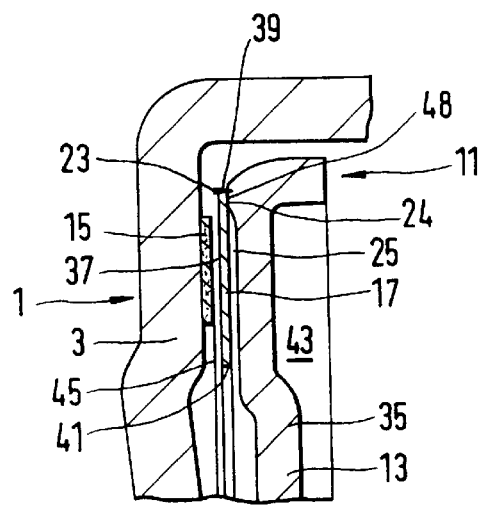

LOCKUP CLUTCH FOR A HYDRODYNAMIC TORQUE CONVERTER

BACKGROUND OF THE INVENTION

1. Field of the Invention

The invention relates to clutch devices and more particularly to a lockup clutch of a hydrodynamic torque converter.

2. Description of the Related Art

EP 0 407 895 B1 discloses a lockup clutch for a hydrodynamic torque converter having an axially movable piston which can be pressed into a switching position via a friction facing at a contact face of a flange of the converter housing. The contact face is formed at a plate which is fastened to the side of the flange facing the piston and which carries the friction facing with which the piston enters a working connection.

During operation of a hydrodynamic torque converter, as a result of centrifugal forces there is higher pressure in the radial outer area than in the area situated further inward radially. Consequently, the piston of the lockup clutch is pressed against the friction facing with increasing radial magnitude and with higher force.

As a result of this, the carrying or supporting behavior is uneven along the radial extension of the friction facing, so that the area pressure occurring at the radial outer side can exceed the tolerance of the friction facing, without reaching the loading capacity of the radial inner region. This results in a reduction in the maximum torque which may be transmitted and increased wear of the friction facings.

This effect is intensified in that, while the lockup clutch is active, the piston is axially supported only in the radial area in which the friction surface is provided. Since this friction surface is often arranged in the outer radial area of the piston, the piston is axially loaded radially inside is area by the pressure in the converter housing without the ability to be supported at that location. Therefore, even a rigid piston will be elastically deformed, which also contributes to uneven support behavior at the friction facing and accordingly to increased wear or the friction facings.

DE 34 10 526 A1 shows the piston of a lockup clutch as a diaphragm-like structural component part which has a pressure plate in the area of extension of the friction facings. However, the above-mentioned fundamental problem cannot be solved in this way since, due to the elasticity of the diaphragm-like structural component part at the radial outside of the friction surface, a corresponding inclined orientation of the pressure plate relative to the axis of rotation and therefore an uneven loading of the friction facings is to be expected. Also, DE 44 25 912 A1 which likewise has an axially elastic piston does not offer a solution to the problem. Rather, it makes use of this problem in that the radial support surface of the friction facing at the converter housing is to be adapted depending on the respective pressure ratios in the torque converter.

SUMMARY OF THE INVENTION

It is therefore an object of the invention to arrange the lockup clutch for a hydrodynamic torque converter in an economical manner such that there is a uniform area pressure at the friction facing.

This and other objects are achieved in accordance with the present invention by connecting a deformation element at one of its radial sides with one of the structural component parts in the working area of a friction facing, for example, the flange of the converter housing or the piston of a lockup clutch. The deformation element is fixed at this structural component part which serves as a support or carrier for said deformation element. By limiting his one connection with the carrier, a joint-like function is associated with this connection, wherein the deformation element can carry out swiveling movements about this connection with relatively small swiveling angles. In the area of the other radial side, however, the deformation element rests on elastic supporting means which are in a working connection with the carrier. The elastic supporting means are capable of absorbing axial forces introduced by the piston but, due to their axial deformability, enable a swiveling movement of the deformation element about its connection with the carrier and accordingly ensure an alignment relative to the piston. As a result, if an inclined position of the corresponding piston location relative to the flange of the converter housing is effected because of the undesirable axial elasticity of the piston due to the pressing force exerted by the converter circuit, the deformation element is oriented under the axial force exerted by the piston corresponding to the inclination of this piston location and accordingly deforms the elastic supporting means. Therefore, regardless of the deformation of the piston caused by the pressure ratios in the converter circuit, a uniform loading of the friction facing is maintained at all times. The torque that can be transmitted accordingly does not undergo any reduction and the friction facing is not subjected to excessive wear.

The above-mentioned swiveling movement of the deformation element takes effect especially when the deformation element is only partially carried by the carrier on the one hand and by the elastic supporting means on the other hand. The area located radially between the carrier and elastic supporting means, enables a sufficiently large axial deflection movement of the deformation element, by means of an axial free space. As such, the deformation element can be forced into the axial free space under load. An axial free space of this kind is preferably formed by an axial cutout in the carrier of the deformation element.

The elastic supporting means are preferably formed by an elastomer which ensures good deformability. An O-ring is an example of one of the most economical possibilities for such supporting means. Of course, other geometric shapes are also conceivable, for example, a ring with a rectangular cross section, if a support of the deformation element over a larger surface area is desired.

In order to prevent the possibility of radial displacement of the elastic supporting means relative to the deformation element, the supporting means are preferably arranged in an axial cutout of the carrier for the deformation element.

The deformation element can be fastened to the piston as well as to the drive-side flange of the converter housing. However, under the given operating conditions and because of the greater axial stiffness of the flange relative to the piston, the flange represents the optimum connection point for the deformation element. The connection with the flange is preferably located at the radial outer side of the deformation element since this can result in an optimum orientation position of the deformation element adapted to the elastic deformation behavior of the piston.

In one embodiment, the deformation element itself can be rigidly constructed and can utilize only the elasticity of the supporting means. In another embodiment, a deformation element which is elastic in the axial direction is also possible. When using an elastic deformation element, the elastic supporting means is not required. According to the disclosed elements, only an axial free space into which the deformation element can be forced is required.

The deformation element can have a contact face for a friction facing fastened to the other structural component part, but can also serve itself to receive this friction facing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and descried preferred embodiments of the invention.

BRIEF DESCRIPTION OF THE DRAWINGS

In the drawings, wherein like reference characters denote similar elements throughout the several views:

FIG. 6 is a modified second embodiment of the lockup clutch according to the invention;

FIG. 7 is an alternative implementation of the embodiment of FIG. 6; and

FIG. 8 is yet another alterative implementation of the embodiment of FIG. 6.

DETAILED DESCRIPTION OF THE PRESENTLY PREFERRED EMBODIMENTS

Figure 1:
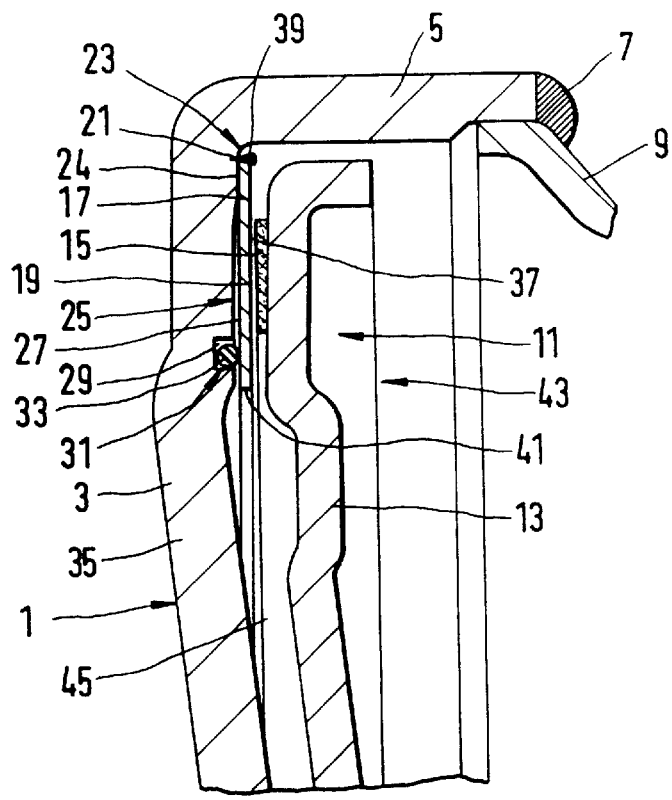
FIG. 1 is a sectional side view of the lockup clutch of a hydrodynamic torque converter according to a first embodiment of the present invention.

FIG. 1 shows a section of the converter housing 1 of a hydrodynamic torque converter having a flange 3 which extends at the radial outer side and passes into an axial shoulder 5 in the circumferential area. The annular shoulder 5 is connected, via a weld 7, to an impeller shell 9 which, together with a turbine and a stator wheel (not shown) forms the hydrodynamic converter circuit 43. A piston 13 of a lockup clutch 11 can be axially loaded in the direction of the flange 3 by this converter circuit 43. The piston 13 carries a friction facing 15 in the outer radial area at its side facing flange 3. A deformation element 17, in the form of a ring 19, is provided opposite the friction facing 15 and is fastened to flange 3 of converter housing 1 by means of a weld 21. The flange 3 accordingly acts as a carrier 35 for the deformation element 17, wherein the weld 21 acts as a connection 23 of deformation element 17 with carrier 35. The connection 23 is formed at the outer radial side 39 of the deformation element 17. Deformation element 17 is radially fitted to flange 3 of converter housing 1 directly inside connection 23 via a supporting surface 24. A recess 27, acting as axial free space 25 for the deformation clement 17, is formed radially inside of this supporting surface 24 in the flange 3 and axially between the flanges and deformation element 17. An axial cutout 29 adjoins axial free space 25 further inward radially, and receives an elastic supporting means 31 in the form of an O-ring 33. The O-ring 33 is preferably formed of an elastomer and is axially supported in the axial cutout 29 on one side and at the deformation element 17 on the other side. In order for the elastic supporting means 31 to be axially supported on one side by the deformation element 17, it extends beyond the surface of the carrier 35 facing the deformation element so as to aid in forming the axial free space 25. The elastic supporting means 31 is secured in its radial position by the axial cutout 29 relative to the deformation clement 17. The elastic supporting means 31 are preferably received at the area of the inner radial side 41 of deformation element 17. Deformation element 17 has a contact face 37 at its axial side facing the friction facing 15 for engaging the same.

The lockup clutch 11 according to the invention operates in the following manner:

When an overpressure is built up in the hydrodynamic converter circuit 43 relative to chamber 45 provided axially between the flange 3 and the piston 13, the piston 13 comes into axial contact with the contact face 37 of the deformation element 17 by its friction facing 15. As a result of very high overpressure in the converter circuit 43, the piston 13 which is axially supported only in the area of the extension of friction facing 15, and accordingly also in its outer radial region, tends to allow the pressure of the converter circuit 43 further radially inward and thereby results in an unwanted axial deformation. This results in an inclined position at piston 13 in the area of extension of friction facing 15, causing the friction facing 15 to approach the deformation element 17 more closely in the inner radial area of the friction facing 15. As a result of the inclined position of the friction facing 15, deformation element 17 slightly swivels around the connection 23 and is forced into the axial free space 25 accompanied by axial deformation of the elastic supporting me 31. Accordingly, the deformation element 17 assumes an inclined position that matches the above-mentioned inclined orientation of the friction facing 15. As a result, friction facing 15 evenly supports piston 13 over its entire radial extension. The deformation element 17 can preferably likewise have elasticity in the axial direction.

Figure 2:
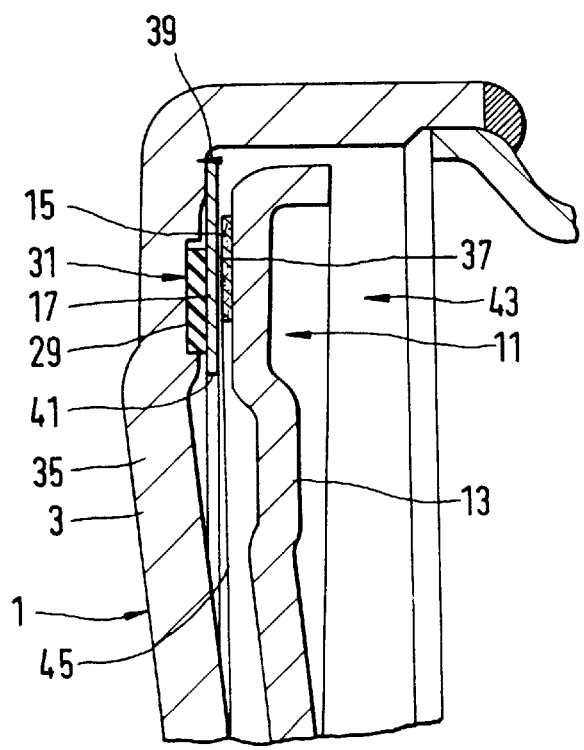
FIG. 2 corresponds to the embodiment of FIG. 1 showing an alternative embodiment of the supporting means in accordance with the present invention.

Through the construction of the elastic supporting means 31 according to FIG. 2, deformation element 17 is supported radially along a larger surface area, so that the deformation element 17 exhibits reduced axial elasticity as a whole.

Figure 3:
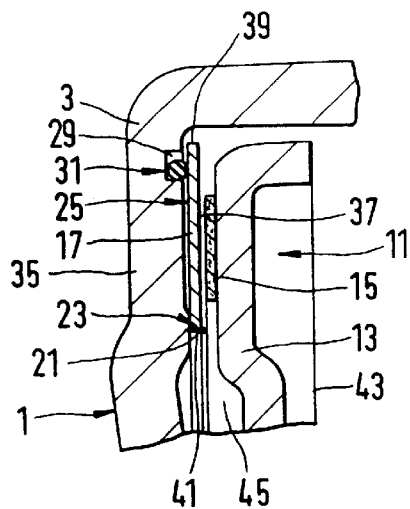
FIG. 3 corresponds to the embodiment of FIG. 1, showing a modified construction of the connection with the flange at the inner radial side of the deformation element.

FIG. 3 shows a variation in which connection 23 of deformation element 17 with flange 3 is carried out at the inner radial side 41 of the deformation element 17. Consequently, axial cutout 29 is provided with the elastic supporting mean 31 in the area of the outer radial side 39.

Figure 4:
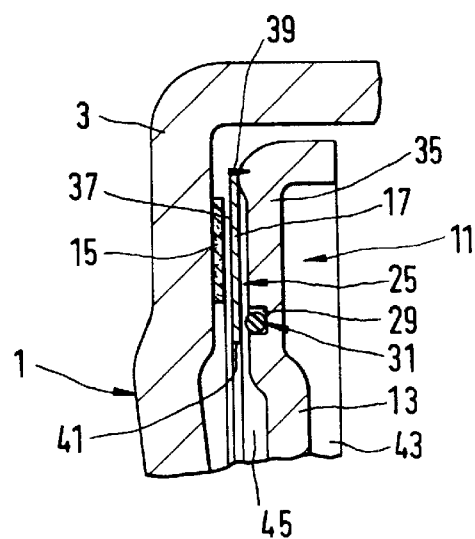
FIG. 4 corresponds to the embodiment of FIG. 1, and shows an alternative connection of the deformation element to the piston.

FIG. 4 another modified embodiment where the deformation element 17 is connected to piston 13. When piston 13, and therefore deformation element 17, is pressed against flange 3 via friction facing 15, the deformation element 17 is oriented with respect to the relatively rigid flange 3 receiving the friction facing 15 as if the piston 13 had not undergone any axial deformation under the influence of the hydrodynamic converter circuit 43. The deformation element 17 is forced into the axial free space 25 formed at the side of the piston 13 facing the flange 3 accompanied by a deformation of the elastic supporting means 31.

Figure 5:
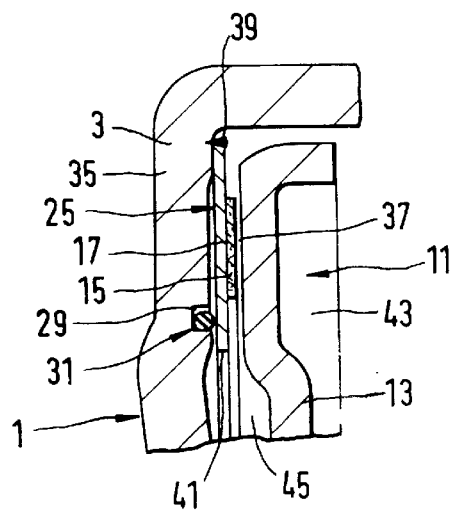
FIG. 5 corresponds to the embodiment of FIG. 1 having the friction facing formed on the deformation element.

The embodiment shown in FIG. 5 substantially corresponds to that of FIG. 1 with the exception that the connection point of fiction facing 15 is changed. Friction facing 15 is fastened to deformation element 17. This does not result in any change with respect to the manner of operation that has already been described in FIG. 1.

In contrast to the embodiments of FIGS. 1 to 5, FIGS. 6 and 7 show other embodiments where deformation element 17 is fastened to a carrier 35 via a connection 23, but which does not contact the carrier 35 via elastic supporting means. In these embodiments, the deformation element 17 has an axially elastic deformation behavior, so that it can be forced into an associated axial free space 25 under the influence of an axial force by the associated friction facing 15 on the contact face 37. According to FIG. 6, the axial free space 25 is formed by a recess 27 provided in the flange 3 at the side facing piston 13. The deformation element 17 is fastened at its outer radial side 39 to the flange 3 of the converter housing 1 via the connection 23 and is axially supported directly radially inside of this connection 23 at a supporting surface 24 of flange 3. When loaded by the fiction facing 15 as the result of the pressing of piston 13 in the direction of flange 3, the deformation element 17 is forced into the axial free space 25 until it comes into contact with the edge of its inner radial side 41 at the flange 3.

The construction of the axial bee space 25 in the converter housing 1 according to FIG. 6 at the flange 3 is relatively cost-intensive. Accordingly this cost-intensive construction can be dispensed with when the deformation element 17 is constructed according to FIG. 7 with a bend 47 which is provided radially closely adjacent to the connection 23. Bend 47 causes the contact face 37 of the deformation element 17 to axially approach the associated friction facing 15. As a result of this bend 47, an axial free space 25 is formed between the deformation element 17 and the flange 3, wherein the deformation clement 17 can spring into this axial free space 25 when axially loaded by the friction facing 15. The deformation element 17 is pressed flat in this way.

While the deformation element 17 is connected to the flange 3 in FIGS. 6 and 7, it is connected to piston 13 according to the embodiment of FIG. 8. Ideally, piston 13 has a bend 48 projecting in the direction of the flange 3 for this purpose. The connection 23 of deformation element 17 with piston 13 is made in the radial area of extension of this bend 48. This creates an axial free space 25 radially inside of this bend 48, into which the deformation element 17 can be forced.

In contrast to FIGS. 6 to 8, it is also possible to arrange the connection 23 of the deformation element 17 in the area of its inner radial side 41. The axial free space 25 would then have to extend radially outward proceeding from a supporting surface 24. It is likewise conceivable to fasten the friction facing to the deformation element 17.

The invention is nor limited by the embodiments described above which are presented as exiles only but can be modified in various ways within the scope of protection defined by the appended patent claims.

I claim:
1. A lockup clutch for a hydrodynamic torque converter having a converter housing with a flange having a contact face and an axially movable piston that can be brought into working engagement with the contact face of the flange in response to a switching position via a friction facing, the lockup clutch comprising:
a deformation element having a first radial side, a second radial side and a contact face extending between said first and second radial sides, said deformation element extending at least within an area of the friction facing such that said contact face is disposed opposite said friction facing;
connection means for connecting said first radial side of said deformation element to one of said piston and said flange, wherein the one of said piston and said flange is a carrier for said deformation element; and
an elastic supporting device disposed in said carrier and supporting said deformation element, said second radial side being in operable connection with said carrier via said elastic supporting device, said elastic support member axially extending beyond a surface of said carrier.

2. The lockup clutch according to claim 1, further comprising an axial space formed radially between said elastic supporting device and said connection means and axially between said carrier and said deformation element, said axial space being formed when said elastic supporting device is dimensioned smaller than said deformation element.

3. The lockup clutch according to claim 2, wherein said deformation element is operably deflected into said axial space.

4. The lockup clutch according to claim 1, wherein said elastic supporting device comprises an elastomer.

5. The lockup clutch according to claim 1, wherein said connection means comprises a weld.

6. The lockup clutch according to claim 1, further comprising:
a recess formed in said carrier on a side facing said deformation element; and
an axial space formed between said deformation element and said carrier by said recess.

7. The lockup clutch according to claim 1, wherein said first radial side comprises an outer radial side of said deformation element.

8. The lockup clutch according to claim 1, wherein said deformation element is fastened to the flange, and the friction facing is fastened to the piston.

9. The lockup clutch according to claim 1, wherein said deformation element is fastened to the piston, and the friction facing is fastened to the flange.

10. The lockup clutch according to claim 1, wherein the friction facing is disposed on said deformation element and said contact face is disposed opposite said friction facing on the other of the piston and the flange not acting as said carrier.

11. The lockup clutch according to claim 4, filer comprising an axial cutout in said carrier for receiving said elastic supporting device.

12. The lockup clutch according to claim 4, wherein said elastic supporting device comprises an O-ring.

13. A lockup clutch for a hydrodynamic torque converter having a converter housing with a flange having a contact face and an axially movable piston that can be brought into working engagement with the contact face of the flange in response to a switching position via at least one friction facing, the lockup clutch comprising:
a deformation element having a first radial side, a second radial side and a contact face extending between said first and second radial sides, said deformation element extending at least within an area of the friction facing such that said contact face is disposed opposite the friction facing;
connection means for connecting said first radial side of said deformation element to one of said piston and said flange, wherein the one of said piston and said flange is a carrier for said deformation element; and
an axial free space formed on a side of said deformation element opposite said contact face and remote from the friction facing, said deformation element being forced into the axial free space under the influence of an axial force exerted by the friction facing.

14. The lockup clutch according to claim 13, further comprising:
- a supporting surface in said carrier for said deformation element, and being disposed adjacent said connection means; and
- a recess in said carrier forming an axial space between said deformation element and said carrier and being radially adjacent said supporting surface.

15. The lockup clutch according to claim 13, wherein said deformation element further comprises a bend radially adjacent said connection means with said carrier, said bend forming an axial space between said deformation element and said carrier, wherein said contact face axially approaches said friction face relative to its area of connection with said carrier.

16. The lockup clutch according to claim 13, wherein the piston is said carrier for the deformation clement, the piston having a bend directed toward the flange, wherein said connection means connects said first radial side of said deformation element to said bend and forms an axial space radially adjacent said bend and between said deformation element and said carrier.

* * * * *